United States Patent [19]

Kazama et al.

[11] 3,984,493

[45] Oct. 5, 1976

[54] HOMOGENEOUS BLEND OF VINYL CHLORIDE POLYMER WITH THERMOPLASTIC POLYESTER-URETHANE

[75] Inventors: Yoshiteru Kazama; Yasuo Miura; Yuji Suzuki; Kazuo Iguchi; Kenji Kawabuchi, all of Wakayama, Japan

[73] Assignee: Kao Soap Co., Ltd., Tokyo, Japan

[22] Filed: Jan. 23, 1975

[21] Appl. No.: 543,509

[30] Foreign Application Priority Data

Jan. 28, 1974 Japan................................ 49-11706

[52] U.S. Cl. .......................................... 260/859 PV
[51] Int. Cl.² ........................................ C08L 75/06
[58] Field of Search ............................ 260/859 PV

[56] References Cited
UNITED STATES PATENTS

| | | | |
|---|---|---|---|
| 3,381,056 | 4/1968 | Beer .............................. | 260/859 PV |
| 3,444,266 | 5/1969 | Reischl et al. ................ | 260/859 PV |
| 3,467,731 | 9/1969 | Wynstra........................ | 260/859 PV |
| 3,718,622 | 2/1973 | Camilleri et al. ............. | 260/859 PV |
| 3,763,054 | 10/1973 | Reischl et al. ................ | 260/859 PV |
| 3,905,929 | 9/1975 | Noll.............................. | 260/29.2 TN |

FOREIGN PATENTS OR APPLICATIONS

844,240  8/1960  United Kingdom ......... 260/859 PV

*Primary Examiner*—Murray Tillman
*Assistant Examiner*—Thurman K. Page
*Attorney, Agent, or Firm*—Woodhams, Blanchard and Flynn

[57] ABSTRACT

A non-crystalline resin composition possessing rubber-like elasticity, prepared by homogeneously mixing (1) 100 parts by weight of a vinyl chloride polymer, with (2) 110 to 160 parts by weight of a thermoplastic polyester-urethane formed by reacting an organic diisocyanate with a polyester diol having a molecular weight of at least 4000, said polyester diol having been formed by reacting a polyol component comprising 1,6-hexanediol and a low molecular weight diol having a side-chain methyl group at a mixing molar ratio of from 70 : 30 to 90 : 10, with a saturated aliphatic dicarboxylic acid having 5 to 8 carbon atoms.

10 Claims, No Drawings

HOMOGENEOUS BLEND OF VINYL CHLORIDE POLYMER WITH THERMOPLASTIC POLYESTER-URETHANE

BACKGROUND OF THE INVENTION

1. Field of the Invention

This invention relates to a resinous composition possessing a rubber-like elasticity which comprises a vinyl chloride polymer and a thermoplastic polyurethane formed by reacting an organic diisocyanate with a polyester diol obtained by reacting a polyol component comprising 1,6-hexanediol and a low molecular weight diol having a side-chain methyl group, with a saturated aliphatic dicarboxylic acid having 5 to 8 carbon atoms.

2. Description of the Prior Art

Thermoplastic polyester-urethanes (for example, Estane 5740-070 or 5470-010, commercially available from B. F. Goodrich Chemical Co.) have excellent physical properties such as high abrasion resistance, high solvent resistance and high toughness and they can provide rubber-like elastomeric materials that do not require vulcanization. However, they have disadvantages owing to the autoxidation sensitivity of the urethane linkage, such as inferior weatherability and heat resistance. Further, they are more expensive than other commercial thermoplastic resins ordinarily used in various fields.

These disadvantages can be overcome by blending into such thermoplastic polyester urethanes suitable amounts of inexpensive vinyl chloride resins which are excellent in weatherability and heat resistance, but molded articles prepared from such conventional polymer blends exhibit no rubber-like elasticity.

The relation between the bound resilience, R, used as an index of the rubber-like elasticity, and the mechanical loss tangent, tan δ, used as an index of the polymeric structure, is represented by the following formula (Journal of Japanese Rubber Association, Volume 39, No. 9, pages 665–673, 1966; Rubber Test Methods, 1963 compiled by the Rubber Association):

$$R/100 = \exp(-\pi \tan \delta)$$

Namely, the smaller is the value of tan δ, the larger is the value of the bound resilience.

The rubber-like elasticity is manifested by the formation of a cross-linked network structure by chemical linkages or strong physical pseudo-linkages in a polymer main chain in the non-frozen state. Accordingly, in order for a polymer to manifest a suitable rubber-like elasticity, it is indispensable that the glass transition temperature of the polymer should be much lower than practical application temperatures and that the value of tan δ at practical application temperatures should be extremely small.

In view of the foregoing, it is considered that in order for a blend comprising a polyester-urethane and a vinyl chloride polymer to have a low glass transition temperature, it will be preferred to use a polyester-urethane composed of recurring units having an average carbon number which is as large as possible. As a result of our experiments, however, it was confirmed that no tendency of reduction of the glass transition temperature is brought about by increasing the weight average carbon atom number, and it was found that if the limit of compatibility between the polyester-urethane and the vinyl chloride polymer is exceeded, the glass transition temperature increases and a product having a desirable rubber-like elasticity cannot be obtained. Further, when, in order to establish a glass transition temperature as low as possible, a symmetric linear polyester-urethane was synthesized while avoiding introduction of side chains, which were considered to bring about adverse effects, and the thus-synthesized polyester-urethane was blended in a vinyl chloride polymer, it was found that the low elongation modulus of a molded article prepared from the above composition increased with the passage of time and it became rigid and hard with increase of the glass transition temperature and that the rubber-like elasticity was eventually lost.

SUMMARY OF THE INVENTION

We discovered that when, in order to prevent the above crystallization, side chains are appropriately introduced into the structure of the polyester-urethane, and when, in order to obtain a desirable rubber-like elasticity, polyol and dibasic acid having a relatively small number of carbon atoms are chosen as the starting materials for the synthesis of the polyester-urethane, and when both the starting polyol and dibasic acid are used at a specific mixing ratio for the synthesis of the polyester-urethane, there is obtained a noncrystalline resinous composition possessing an excellent rubber-like elasticity, superior to that of the conventional products. Based on this discovery, we have made this invention.

It is therefore a primary object of this invention to provide a resin composition comprising a thermoplastic polyester-urethane and a vinyl chloride polymer which retains the excellent physical properties of both the thermoplastic polyester-urethane and the vinyl chloride polymer, and which additionally possesses an excellent rubber-like elasticity.

DETAILED DESCRIPTION OF THE INVENTION

The foregoing object and other objects of this invention are attained by forming a homogeneous blend consisting essentially of (1) 100 parts by weight of a vinyl chloride polymer, with (2) 110 to 160 parts by weight of a thermoplastic polyester-urethane formed by reacting an organic diisocyanate with a polyester-diol having a molecular weight of at least 4000, said polyester-diol being formed by reacting a polyol component comprising (a) 1,6-hexanediol and (b) a low molecular weight diol having a side-chain methyl group, at a mixing molar ratio of (a) : (b) of from 70 : 30 to 90 : 10, with a saturated aliphatic dicarboxylic acid having 5 to 8 carbon atoms.

The thermoplastic polyester-urethane used as one component (2) of the composition of this invention is prepared by reacting an organic diisocyanate with a polyester-diol having a molecular weight of at least 4000, said polyester-diol being formed by reacting a saturated aliphatic dicarboxylic acid having 5 to 8 carbon atoms with a polyol component comprising (a) 1,6-hexanediol and (b) a low molecular weight diol having a side-chain methyl group at a mixing molar ratio of (a) : (b) of from 70 : 30 to 90 : 10. When the mixing molar ratio of (a) 1,6-hexanediol and (b) the low molecular weight diol having a side chain methyl group is lower than 70 : 30, the glass transition temperature increases and no crystallization occurs even under stress (reduction of the tenacity occurs). Accordingly, a mixing molar ratio of (a) : (b) of less than 70 : 30 is not acceptable. When the above mixing molar ratio is higher than 90 : 10, crystallization is extreme and the physical properties of the composition are drastically degraded with the passage of time. Accordingly, a mixing molar ratio of more than 90 : 10 is not acceptable in view of the physical properties.

As the methyl side chain-containing low molecular weight diol, there can be employed diols of 3 to 8 carbon atoms having at least one side-chain methyl group, such as propylene glycol, 1,3-butylene glycol, neopentyl glycol and trimethylpentane diol.

As the saturated aliphatic dicarboxylic acid having 5 to 8 carbon atoms, there can be used glutaric acid, adipic acid, pimelic acid, suberic acid and methyladipic acid. Use of adipic acid is especially preferred.

It is critical that the molecular weight of the polyester-diol derived from the 1,6-hexanediol, the methyl side chain-containing low molecular weight diol and the saturated aliphatic carboxylic acid having 5 to 8 carbon atoms, should be at least 4000. The upper limit of this molecular weight is not critical and it can be up to about 20000. If the molecular weight is lower than 4000, the rubber-like elasticity, given by the bound resilience is lowered. A preferred molecular weight range is from 6000 to 10000.

The organic diisocyanate reacted with the polyester-diol can be selected from diisocyanates conventionally used to prepare urethane resins. For example, there can be used at least one member selected from 4,4'-diphenylmethane diisocyanate, 4,4'-diphenyl isocyanate, 2,4-tolylene diisocyanate, 2,6-tolylene diisocyanate, 1,5-naphthylene diisocyanate, o-, m- and p-xylylene diisocyanates, tetramethylene diisocyanate, pentamethylene diisocyanate, hexamethylene diisocyanate and mixtures thereof. If desired, chlorinated or brominated diisocyanates or phosphorus-containing diisocyanates can be used in combination with the foregoing organic diisocyanates.

No technical problem is caused by replacing a part of the organic diisocyanate with a polyisocyanate having a functionality of at least 3 and using such a mixture as the diisocyanate component.

The vinyl chloride polymer to be blended with the thermoplastic polyester-urethane includes vinyl chloride homopolymers and vinyl chloride copolymers comprising 85 to 99.9 percent by weight of vinyl chloride and the balance, i.e., 0.1 to 15 percent by weight, is one or more monomers copolymerizable with vinyl chloride. As the monomers copolymerizable with vinyl chloride, there can be mentioned vinyl acetate, vinylidene chloride, acrylonitrile, diethyl maleate, dibutyl maleate, diethyl fumarate, and esters of acrylic and methacrylic acids such as methyl acrylate, ethyl acrylate, methyl methacrylate and butyl methacrylate. In general, vinyl chloride homopolymers are more readily commercially available than vinyl chloride copolymers, and therefore, homopolymers are used more frequently in practice.

The degree of polymerization of the vinyl chloride polymer is not particularly critical, but is is generally preferred that the degree of polymerization thereof be at least 600 and a higher degree of polymerization results in a higher elasticity in the composition of this invention. The upper limit of this degree of polymerization is not critical and it can be up to about 3000.

In the composition of this invention, when the amount of the thermoplastic polyester-urethane is within the range of from 110 to 160 parts by weight per 100 parts by weight of the vinyl chloride polymer, the glass transition temperature is from about $-3°$ to $-10°C$. and hence, the rubber-like elasticity of the composition is excellent. Further, the physical properties of the composition do not appreciably change with the passage of time and its other properties such as tensile strength are maintained at desirable levels. In contrast, if the amount of the thermoplastic polyester-urethane is outside the range of from 110 to 160 parts by weight per 100 parts by weight of the vinyl chloride polymer, the above-mentioned advantageous effects are not attained.

The preparation of the resin composition from the above-mentioned thermoplastic polyester-urethane and the vinyl chloride polymer is accomplished by pre-mixing both the resin components at the prescribed weight ratio by means of any longitudinal or horizontal mixer customarily used for mixing of resin materials and then heating and homogeneously blending and kneading the premix batchwise or continuously by using a mixing roll, an internal mixer or a kneading extruder. It is possible to heat and knead both the components directly without performing the premixing treatment. Further, in order to reduce the thermal degradation of the vinyl chloride polymer, it is possible to add a heat stabilizer to the resinous composition. If desired, such additives as fillers, colorants, lubricants, plasticizers and the like can be added in addition to the stabilizer. The amounts of these optional additive substances can be in accordance with conventional practice.

The composition of this invention has an excellent rubber-like elasticity in addition to the excellent properties inherent to the thermoplastic polyester-urethane such as high toughness, high abrasion resistance and high solvent resistance and the excellent properties inherent to the vinyl chloride polymer such as high weatherability, high heat resistance and good processability. Accordingly, the composition of this invention can be molded into articles in which rubber-like elasticity is required, such as films, sheets, synthetic leathers, belts, tubes, hoses and packings, by various conventional molding processing methods. Further, the composition of this invention can be used broadly in various fields for molding of electric equipment parts, e.g., coated wires, and as powdery adhesives for sewing garments and the like and as adhesives for injection-molded shoes and the like.

This invention will now be further described, in greater detail by reference to the following illustrative Examples. In the Examples all references to "parts" refer to parts by weight.

The physical properties mentioned in the Examples were measured according to the following test methods:

1. Bound Resilience (%)

The bound resilience was determined at $25° \pm 10°C$. by using a Schob resilinometer. A sample having a thickness of $6 \pm 1$ mm was formed by piling 6 sheets having a thickness of about 1 mm, and the bound resilience (%) was measured by performing correction of the thickness depending on the hammer falling height according to the following formula:

Measured value = read value $\times (11/S + 5)$ (in the case of a hammer falling height of 25 cm)

Measured value = read value $\times (15/S + 9)$ (in the case of a hammer falling height of 12.5 cm)

In the above formula, S denotes the actual thickness of the sample.

2. Glass Transition Temperature (0°C.)

The viscoelasticity was measured by a solid viscoelasticity spectrometer manufactured by Iwamoto Seisakusho, and the glass transition temperature (0°C.) was estimated from the maximum tan δ observed when the temperature was changed.

3. 100 % Modulus (Kg/cm²)

According to the tensile test method of JIS K-6723, the stress at 100 percent elongation was determined at a rate of elongation of 200 mm/min and the determined value was defined at 100 percent modulus.

4. Tensile Strength (Kg/cm²)

The tensile strength was determined according to the tensile test method of JIS K-6723 by using an autograph manufactured by Shimazu Seisakusho.

5. Ratio of Change with Time (%)

According to the tensile test method of JIS K-6723 the 50 percent modulus was determined at a rate of elongation of 50 mm/min. The ratio of change with time was calculated from the following formula:

$$\text{Ratio (\%) of Change with Time} = \frac{E_{30} - E_1}{E_1} \times 100$$

wherein $E_1$ denotes the 50 percent modulus determined 1 day after the molding and $E_{30}$ denotes the 50 percent modulus determined 30 days after the molding.

EXAMPLE 1

200 Parts of poly-1,3-butylene//hexylene-adipate having a hydroxyl value of 17.8 (molecular weight = 6300), which was prepared from a polyol component comprising 1,6-hexanediol and 1,3-butylene glycol at a mixing molar ratio of 80 : 20, and adipic acid, was heated at 80°C., and 8 parts of 4,4'-diphenylmethane diisocyanate was added thereto and the mixture was vigorously agitated for 3 minutes to obtain a homogeneous mixture. Then, the mixture was aged at 140°C. for 3 hours in a nitrogen atmosphere to complete the urethanation reaction. There was obtained a polyesterurethane (I).

Separately, 100 parts of polyvinyl chloride having a degree of polymerization of 1050, 0.8 part of calcium stearate and 1.2 parts of zinc stearate were kneaded on a hot roll maintained at 160°C. for 5 minutes. Then, 120 parts of the polyester-urethane (I) prepared in advance was gradually added to the kneaded mixture and the blend was kneaded for 10 minutes to form a homogeneous composition. The thus-obtained sheet having a thickness of about 1.2 mm was pressed under a pressure of 60 Kg/cm² for 5 minutes by means of a hot press maintained at 165°C. The bound resilience, glass transition temperature, tensile strength and ratio of change with time were measured with respect to the thus-obtained polymer blend molded article. The following results were obtained:

Bound resilience: 11.7 %
Glass transition temperature: −3° C.
100 % Modulus: 33 Kg/cm²
Tensile strength: 206 Kg/cm²
Ratio of change with time: 33 %

EXAMPLE 2

200 Parts of poly-1,3-butylene/hexylene-adipate having a hydroxyl value of 14.2 (molecular weight = 7900), which was prepared from a polyol component comprising 1,6-hexanediol and 1,3-butylene glycol at a mixing molar ratio of 87 : 13, and adipic acid, was heated at 80°C., and 6.4 parts of 4,4'-diphenylmethane diisocyanate was added thereto and the mixture was vigorously agitated for 3 minutes to form a homogeneous mixture. Then, the mixture was aged at 140°C. for 3 hours in a nitrogen atmosphere to complete the urethanation reaction. A polyester-urethane (II) was obtained.

Separately, 100 parts of polyvinyl chloride having a degree of polymerization of 1050, 0.8 part of calcium stearate and 1.2 parts of zinc stearate were kneaded for 5 minutes on a hot roll maintained at 160°C. Then, 120 parts of the above polyester-urethane (II) was gradually added to the kneaded mixture and the blend was kneaded at 160°C. for 10 minutes to obtain a homogeneous composition. The thus-formed sheet having a thickness of about 1.2 mm was pressed under a pressure of 60 Kg/cm² for 5 minutes by means of a hot press maintained at 165°C. The physical properties of the resulting polymer blend molded article were measured. The following results were obtained:

Bound resilience: 14.7 %
Glass transition temperature: −4°C.
100 % Modulus: 34 Kg/cm²
Tensile strength: 328 Kg/cm²
Ratio of change with time: 77 %

EXAMPLE 3

In the same manner as described in Example 1, a polymer blend molded article (test sheet) similar to that obtained in Example 1 was prepared by changing the mixing molar ratio of 1,6-hexanediol : 1,3-butylene glycol and the molecular weight of poly-1,3-butylene/hexylene-adipate as shown in Table 1 give below. The results of the tests made on the thus-obtained sheets are shown in Table 1.

For comparison, a sheet was similarly prepared by using a polyol component in which the above mixing molar ratio was outside the range specified in this invention (Referential Example) and another sheet was similarly prepared by using 1,6-hexanediol alone as the polyol component (Comparative Example), and these sheets were similarly tested to obtain the results shown in Table 1.

Table 1

| Analysis Values of Polyester | Example of This Invention | Referential Example | Comparative Example |
|---|---|---|---|
| Hydroxyl value (OH value) | 11.9 | 14.6 | 19.7 |
| Molecular weight | 9400 | 7700 | 5700 |
| 1,3-Butylene glycol/1,6-hexandediol molar ratio | 25/75 | 36/64 | 0/100 |
| Physical Property Test Results of Molded Article | | | |
| Bound resilience (%) | 13.1 | 12.0 | 7.7 |
| Glass transition temperature (°C.) | −7 | −5 | −5 |
| 100 % Modulus (Kg/cm²) | 33 | 36 | 34 |
| Tensile Strength (Kg/cm²) | 168 | 130 | 295 |

Table 1-continued

| Analysis Values of Polyester | Example of This Invention | Referential Example | Comparative Example |
|---|---|---|---|
| Ratio (%) of Change with Time | 27 | 36 | 300 |

EXAMPLE 4

200 Parts of poly-1,3-butylene/hexylene-adipate having a hydroxyl value of 20.4 and a molecular weight of 5500, which was prepared from a polyol component comprising 1,6-hexanediol and 1,3-butylene glycol at a mixing molar ratio of 90 : 10, and adipic acid, was heated at 80°C., and 6.4 parts of 4,4'-diphenylmethane diisocyanate was added thereto and the mixture was vigorously agitated for 3 minutes to form a homogeneous mixture. Then, the mixture was aged at 140°C. for 3 hours in a nitrogen atmosphere to complete the urethanation reaction. A polyester-urethane (III) was obtained.

Separately, 100 parts of polyvinyl chloride, 0.8 part of calcium stearate and 1.2 parts of zinc stearate were kneaded for 5 minutes on a hot roll maintained at 160°C. Then, 120 parts of the above polyester-urethane (III) was gradually added to the kneaded mixture, and the blend was kneaded at 160°C. for 10 minutes to render the blend homogeneous. The thus-obtained sheet having a thickness of 1.2 mm was pressed under a pressure of 60 Kg/cm$^2$ for 5 minutes by means of a hot press maintained at 165°C. The physical properties of the thus-obtained polymer blend molded article were measured. The following results were obtained:

Bound resilience: 12.7 %
Glass transition temperature: −3°C.
100 % Modulus: 34 Kg/cm$^2$
Tensile strength: 247 Kg/cm$^2$

COMPARATIVE EXAMPLE

A molded sheet was prepared in the same manner as described in Example 4 except that 120 parts of a commercially available thermoplastic polyester-urethane for polyblend with vinyl chloride resins (sold under the tradename "Ultramoll PU" and manufactured by Bayer AG, West Germany) was used instead of 120 parts of the polyester-urethane used in Example 4. The physical properties of the molded sheet were measured. The following results were obtained:

Bound resilience: 8.4 %
Glass transition temperature: 17°C.
100 % Modulus: 76 Kg/cm$^2$
Tensile strength: 186 Kg/cm$^2$ Molded sheets were similarly prepared by using commercially available "Estane 5740-070" and "Estane 5740-010" (manufactured by B. F. Goodrich Chemical Co.) as the thermoplastic polyester-urethane instead of the above "Ultramoll PU". The results obtained were substantially the same as those obtained in the case of "Ultramoll PU". As a result of the viscoelasticity spectrum measurement of the blend of "Estane" and polyvinyl chloride, it was found that phase separation occurred in the blend and both the components were present in the heterogeneous state, and there was observed no peak of the intermediate compatibility phase indicating homogeneous mixing of the polyester-urethane and polyvinyl chloride.

The embodiments of this invention in which an exclusive property or privilege is claimed are defined as follows:

1. A non-crystalline elastomeric resin composition having a glass transition temperature of from about −3° to −10°C, consisting essentially of a homogeneous blend of
   I. polyvinyl chloride or a copolymer of from 85 to 99.9 percent by weight of vinyl chloride and the balance is at least one monomer copolymerizable with vinyl chloride, and
   II. a thermoplastic polyester-urethane obtained by reacting an organic urethane-forming diisocyanate with a polyester diol having a molecular weight of from 6000 to 10000, said polyester diol having been obtained by reacting a saturated aliphatic dicarboxylic acid having from 5 to 8 carbon atoms, with a polyol component consisting essentially of a mixture of (a) 1,6-hexanediol and (b) at least one diol selected from the group consisting of propylene glycol, 1,3-butylene glycol, neopentyl glycol and trimethylpentane diol, the molar ratio of (a) : (b) being in the range of from 70 : 30 to 90 : 10, the composition containing from 110 to 160 parts by weight of II, per 100 parts by weight of I.

2. A composition according to claim 1 in which component I has a degree of polymerization of at least 600.

3. A composition according to claim 1 in which said saturated aliphatic dicarboxylic acid is selected from the group consisting of adipic acid, pimelic acid, suberic acid and methyladipic acid.

4. A composition according to claim 1, in which said saturated aliphatic dicarboxylic acid is adipic acid.

5. A composition according to claim 4, in which said diisocyanate is 4,4'-diphenylmethane diisocyanate.

6. A composition according to claim 4, in which said diisocyanate is 4,4'-diphenyl isocyanate.

7. A composition according to claim 4, in which said diisocyanate is 2,4-tolylene diisocyanate.

8. A composition according to claim 4, in which said diisocyanate is 2,6-tolylene diisocyanate.

9. A composition according to claim 4, in which said diisocyanate is 1,5-naphthylene diisocyanate.

10. A composition according to claim 4, in which said diisocyanate is o-, m- or p-xylylene diisocyanate.

* * * * *